United States Patent [19]
Moore

[11] 3,853,349
[45] Dec. 10, 1974

[54] LIGHT-WEIGHT, WRECK-RESISTANT VEHICLE

[76] Inventor: Alvin Edward Moore, Manini Way, Diamondhead, Rt. One, Bay St. Louis, Miss. 39520

[22] Filed: Sept. 15, 1972

[21] Appl. No.: 289,478

[52] U.S. Cl. ............................... 296/28 R, 180/30
[51] Int. Cl. ............................................ B62k 11/00
[58] Field of Search .......... 296/28 R; 115/1; 180/30

[56] References Cited
UNITED STATES PATENTS

| | | | |
|---|---|---|---|
| 1,484,410 | 2/1924 | Pridgen | 115/1 R |
| 3,189,301 | 6/1965 | Parkes | 244/107 X |
| 3,237,218 | 3/1966 | Moore | 9/2 A |
| 3,465,840 | 9/1969 | Summers | 180/30 |
| 3,575,251 | 4/1971 | Moore | 115/1 |

*Primary Examiner*—Kenneth H. Betts
*Attorney, Agent, or Firm*—Alvin Edward Moore

[57] ABSTRACT

A vehicle, adapted for land travel, having strong, light-weight walls, comprising curved, joined-together rows of parallel-axes, thin-metal, cylindrical or corrugated cans, fastened by bonding material and screws between strips of mesh or pipe strap, and optionally sheathed in V-shaped strips or masses of foam plastic or other insulation, between the cans and vehicle skin means. Four such rows, extending longitudinally or transversely of the vehicle, may be end-joined at four corners by overlapping ends of the mesh or pipe strap in each of a plurality of elongated loops, forming the framework of the upright walls. These may be topped by a substantially flat roof comprising curved rows that extend longitudinally of the vehicle, oppositely curved in opposite , left and right halves of the top. The sidewall rows are fixed at the bottom of the vehicle's sidewalls to curved deck rows that are similar to the roof rows. And to the deck of these rows (comprising a sheet of tough rubber, other plastic or plywood over the vertical-axes cans) a lower, vehicle-driving part is strongly attached along a longitudinally-extending central portion of the vehicle. This part preferably comprises curved can rows that are closer together than those of the sidewalls with their strips of mesh or pipe strap that are at the same level end-joined at rounded corners to form a loop. Within these loops a forward steering wheel, a rear driving wheel, and motive means powering the rear wheel are mounted. Curved rows of vertical, parallel-axes bumper cans, having doorway spaces between bumper can-row ends, filled with fiberglass shredded foam plastic, shredded bark, preservative-treated popcorn or other shock-absorbing material, are fixed on the outside of the vehicle at and above the deck level. The vehicle may have three or four road-engaging wheels; but preferably it has two motorcycle-like wheels and a sidewheel on each side, optionally and normally clear of the road, limiting and stopping excessive rolls. The vehicle is optionally somewhat stabilized by balloons at its top; and if the balloons are large enough (with or without small wings jutting thru the sidewalls) the vehicle may be a wheeled aircraft.

25 Claims, 12 Drawing Figures

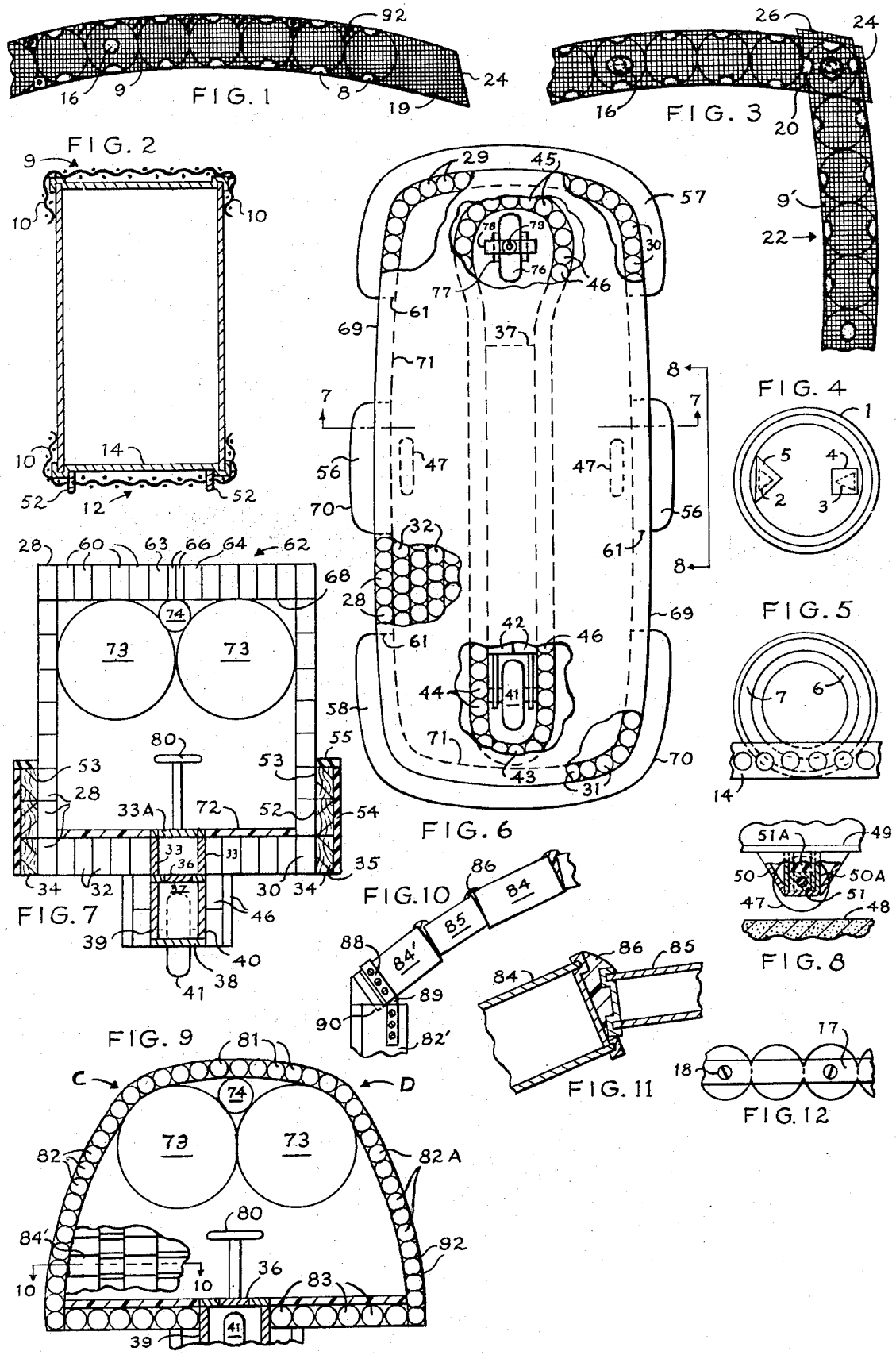

LIGHT-WEIGHT, WRECK-RESISTANT VEHICLE

This invention pertains to a light-weight, strong, land-traversing vehicle, capable of lessening or eliminating damage in crashes. It may be incorporated in a wheeled and/or skid-bottomed overland vehicle, for example in an automobile, trailer or mobile home, golf cart, railroad or monorail vehicle, or wheeled aircraft, hovercraft, spacecraft or snowmobile. Although it may comprise four wheels it preferably has two or three wheels and two middle, lateral wheels, normally clear of the road, one of which engages the road when the vehicle excessively rolls to one side. Such a vehicle has been disclosed in this inventor's U.S. Pat. No. 3,575,251 of Apr. 20, 1971; and in some respects the present invention comprises improvements of the structure of this prior patent.

Motor vehicles of currently standard construction are heavy, require much propulsive power because of their weight, and in collisions are subject to much damage, loss of life and maiming of passengers. And when a risky and costly effort is made to reduce vehicular weight —in aircraft for example, with common thin aluminum construction elements —the reduction frequently only increases the vulnerability of the conventionally-designed craft. There is thus a great need for a vehicle that is well cushioned, to absorb the shocks of severe impacts, and has a very strong but very light-weight body.

In view of these facts, this invention has, among other objects, the following objectives: (1) a relatively light-weight but extremely strong vehicle, adapted to traverse land at least part of the time of its travel or use; (2) such a vehicle having firm, strong, inner load-carrying structure and outer impact-cushioning structure that protects its walls against fracture and collapse in crashes or severe storms; (3) a land-traversing vehicle having walls comprising rows of cans of substantially parallel axes, flanked and braced by strips of wire mesh or pipe strap; (4) vehicular structure comprising such rows of corrugated, sealed, light-weight, tubular receptacles containing gaseous material under pressure above that of the atmosphere; (5) a vehicle having in its top part balloons that aid in stabilizing it against rolls and pitching; and (6) a safe, stabilized car, having only two wheels that contact the ground except when tipping over or, optionally, having three or four ground-engaging wheels.

Other objects and the specific structure of the invention will become apparent from the following specification and from the accompanying drawings, in which: FIG. 1 is a plan view, partly broken away, of one of the rows of parallel-axes cans, used as construction elements of the vehicular body walls, deck and bumper means; FIG. 2 is a cross-sectional view of one of the construction-element can-rows from a plane containing the axis of one of the cans, comprising cans and apertured can-holding strips; FIG. 3 is a detail plan (or side-elevational) view, partly broken away, illustrating an assembly of two of the rows at a corner of the vehicular body; FIG. 4 is a plan view of a common type of used can, with its apertures sealed over; FIG. 5 is a fragmentary plan view of an optional type of new or used can, also illustrating an optional type of apertured strip for holding the cans in a strong row; FIG. 6 is a plan view of one form of the completed vehicle, comprising rows of cans, partly broken away in its forward and rear portions (along a horizontal plane above the bumpers) to illustrate sidewall cans in cross section, partly broken away in a horizontal plane below the deck to show lower-structure cans in section and wheels in plan view, and partly broken away in a middle portion along a horizontal plane to indicate cans of the deck (or top) in cross-sectional view; FIG. 7 is a sectional view from the vertical plane 7—7 of FIG. 6; FIG. 8 is a fragmentary, reduced-scale, partly sectional side-elevational view from the plane 8—8 of FIG. 6, illustrating one of the roll-stopping, middle side wheels; FIG. 9 is a sectional view from a vertical plane comparable to that indicated at 7—7 of FIG. 6, showing an alternative form of the vehicular body; FIG. 10 is a fragmentary sectional view from a horizontal plane comparable to that indicated at 10—10 in FIG. 9, on a scale enlarged from that of FIG. 9, illustrating corner structure of the invention form of FIG. 9, comprising curved front-end rows of cans and sidewall can-rows; FIG. 11 is a fragmentary sectional view from a horizontal plane containing the axes of end-joined front-end (or rear-end-wall) cans, on a scale enlarged from that of FIG. 10; and FIG. 12 is a fragmentary plan view of a row of parallel-axes cans that is straight.

Each of the forms of the invention shown in FIGS. 6 and 9 comprises juxtaposed rows of parallel-axes cans which may be of the type shown in FIGS. 1 to 4 or the kind illustrated in FIG. 5, these cans being optionally new or used and securely and bracingly fastened together between parallel strips of strong, apertured material of metal (or optionally of fabric-reinforced plastic). The can shown in FIGS. 2 and 4 may be of the currently common, liquid-containing or coffee-containing type —for example, a beer can, or the preferably corrugated type of used tomato-juice or fruit-juice can shown at 1 in FIG. 4. This can has been opened as indicated at 2 and 3 and then resealed by a piece of adhesive tape 4 (or 5). The adhesive tape may be mastic tape, or of fiberglass and adhesive, or of aluminum and adhesive. The sealing piece may be rectangular as at 4 or triangular as at 5, and preferably is hand-torn from a tape roll that is perforated to permit easy manual removal of each piece. Preferably it is in the form of a right, isosceles triangle (having two sides equal), which is repetitively indicated on the roll of tape by a continuous series of punctures, and involves no loss of material in removing the pieces. Optionally, the pieces 4 and 5 may be sheathed over with epoxy or other strong glue —for example: liquid epoxy cement poured in a layer over the end closures of the cans, or bits of epoxy putty placed over pieces 4 and 5 by a putty knife.

The new or used can of FIG. 5 is of the common paint-can type, and optionally may be a used paint can. It comprises a flanged snap-lid 6, which is sealingly forced down into tight contact with the bottom of the groove 7 and with the downwardly and inwardly extending annular flange that is integral with this bottom and is covered by the lid in FIG. 5.

The cans may be assembled in straight rows or, as illustrated in FIGS. 1 and 3, in curved rows. They may be placed in fixtures or forms having low, straight or curved side walls, and while in the fixture one of the strips of apertured material stretched over them, and while thus stretched epoxy-glued (or soldered, or brazed), as at 8, to the can end closures. In the assembly of FIGS. 1 and 3 the apertured strip 9, optionally of metal-wire mesh or nylon or other strong plastic network, covers the entire surface of the can-end closures.

When, as is preferable, the strip is of metal-wire mesh (for instance, of hardware cloth) this mesh is stamped or otherwise forced and cut into the form indicated in FIG. 2, having substantially parallel flanges 10; and then, with or without use of the above-described fixture, the flanged strip is snugly placed over the can ends and bonded in place. After the strip is thus bonded in can-bracing position the incomplete can row is inverted and the second strip 12 is similarly bonded to the can ends 14. Optionally, the strips 9 and 12 may be narrower than the diameter of the cans; and also optionally, as indicated in FIG. 5 at 14, the strips may be of apertured, solid, strength-providing material —for example of commercially obtainable steel pipe strap. Epoxy putty or other bonding material is placed thru the pipe-strap apertures that are over the can ends, thus strongly fastening the cans together and within the parallel pair of row-bracing strips. If desired, sheet-metal screws (with or without washers) may first be screwed thru the mesh or pipe strap, forcing the apertured strips tightly against the can ends and then epoxy or other bonding material is sealingly placed over the screw heads. Such a screw-and-bonding-material assembly is indicated at 16 in FIG. 1. Optionally, the apertured strip 14 (or the alternative solid-material strip 17 of FIG. 12) may be placed across the middle portion of the can and there bonded and sealed in place by the screws and bonding material 16; and optionally the strip 14 may be wider than it is exampled in FIG. 5.

In FIG. 12, the pair of optional can-holding strips 17 may be of sheet metal (for example, of aluminum) or of adhesive tape (for example, comprising fiberglass or aluminum, coated with adhesive). These strips are on opposite can ends of the row, which may be straight as in FIG. 12, or curved as in FIG. 1. When they are of adhesive tape and the cans are of the used type the tape optionally may also be utilized to cover the holes in the ends of the cans. In any event, either the adhesive tape or the sheet-metal strip preferably is strongly bonded by epoxy putty or other strong glue between portions of the strips and can ends; and if desired extra strength of the attachment may be obtained by drilling small holes thru each strip and adjacent can ends, inserting sheet-metal screws 18 tightly in the drilled holes (these screws being of larger diameter than the holes) and, preferably, sealing over the screw heads and adjacent strip portions with epoxy putty or other bonding material. The type of parallel-axes can-row indicated in FIG. 12 optionally may be straight as shown, or curved as in FIG. 1.

The above-described rows of cans may be assembled in vehicular-body corners as indicated in FIGS. 3, 6 and 7. As indicated in FIGS. 1 and 3, two extended end portions 19 of an adjacent pair of the apertured strips (from which portions of the lateral flanges 10 have been cut away) are slightly forced apart and straddled over the end can 20 and over an end portion of the mesh 9' of the row 22; and then the end 24 of the portion 19 is hammered or otherwise forced downward into a flange that engages the sidewall of the can 20. The flange 26 at the end of row 9' has been similarly formed before the above-described assembly.

Assembly of the vehicle of FIGS. 6 and 7 optionally comprises the following steps: (1) The four outer deck rows of cans (the lowest ones of the rows 28, 29, 30 and 31 of FIG. 6) are connected at four corners as illustrated in FIG. 3. At each corner, bolts are threaded thru the contiguous plies of mesh (or pipe strap), and their nuts and adjacent mesh portions are covered with epoxy putty (or solder). This step involves inversion of the connected four rows, for bolting and gluing or otherwise bonding of the connected four rows, for bolting and gluing or otherwise bonding both the tops and bottoms of the overlapped end pieces of the apertured strips at the corners.

2. While the four rows are on the plant floor (or up on a table or bench), the interior deck rows are successively assembled, each extending longitudinally nearly the full distance between the rows 29 and 31. Because of the slight outward bowing (car-strengthening outward arches) of these rows there is a gap between cans of 32 and those of 29 and/or 31, but this gap is bridged over by end portions 19 that are relatively longer than those illustrated in FIGS. 1 and 3, these portions being straddled over and bolted and bonded to the top and bottom apertured strips 9'. Preferably, before this bolting and bonding the top strip 9 is temporarily bent upward, and into each gap short, vertically-arranged tubular elements (small-diameter pieces of bamboo or plastic pipe of the water-conveying type) are placed and epoxy-bonded together. Optionally, the gap related to one of the rows 32 is adjacent to the row 29, and in assembly of the next row 32 its forward can is in contact with a can of 29 and the gap is then between a can of 31 and the rearmost can of 32. In joining the side flanges 10 of the rows 28 and 32 together, curved short pieces of wire are threaded thru adjacent apertures of the juxtaposed pieces of mesh, and the upper ends of the wires are twisted together, bent, and covered with bonding material, thus making a strong joint between row sides. The rows 32 are successively assembled inward from a row (28 or 30) on each side of the deck, and at its middle there is a gap between adjacent, oppositely curved rows. Into this gap the curved frame 33, snugly flanked by cans, having a hinged, trapdoor top 33A, is placed and bonded to contiguous cans. (3) The eight bottom can rows 34 of the bumper means are assembled, joined at rounded corners, and twist-wired and bonded at their inner sides to the rows 28 in the manner of step (2). Each of the cans of 34 preferably contains shock-absorbing insulation 35 (fiberglass, shredded foam plastic, shredded bark, preservative-treated popcorn or other shock-absorbing material).

(4) Over the whole of the rows 28 to 34 a sheet of wire mesh is stretched and epoxy-bonded (and optionally sheet-metal-screwed) to the can ends and pieces 9 (or 17) of can-reinforcing network. This wire-mesh sheet has a curved hole cut out of its middle portion, the edges of which fit around and are epoxy-bonded to edges of the frame 33.

(5) The resultant incomplete deck is turned over; and another sheet of wire mesh is fastened in the manner of step (4) to other ends of the cans 28 and 32 and to adjacent apertured strips 9 (or 14 or 17).

(6) The top 36 of the metal or wooden or fabric-reinforced plastic box 37, having a hinged door within a frame, is partly coated with epoxy putty or other strong, pasty glue on its frame and the box is inverted and laid over and thus its door frame is glued to edges of the frame 33 and also glued to forward and rearward portions of the can rows that flank 33; and the joint is reinforced by short pieces of pipe strap or mending plates, screwed or nailed and glued to 33 and 39. Thus the box 37, which is mostly rectangular but has a curved rear end, is bonded to apertured strips (9 or 14) of these forward and rearward portions and glued and strapped to the curved frame 33; and within 33 there is provided a second box space, wide enough for tools or other useful load to be stored in it. When, as is currently preferred, electric batteries are used as the vehicle's source of power, the hinged lid of 36 permits addition from above of water to the batteries and recharging of them via current-conducting means, connected to the batteries. The bottom 38 of the box 37 is detachably bolted to the side walls 39 and 40 and to the associated box-end walls, so tht it may be removed for repair or replacement of the wheel 41, drive shafts, motor and its source of power, all of these elements being supported by the bottom 38 and the wheel 41.

The bottom 38 is apertured to provide clearance for the wheel 41 and preferably is upwardly flanged, for strength, at edges of the hole. Optionally, this bottom and its supported elements may reciprocate vertically between the side walls 39 and 40 against the damped resilience of shock-absorbing springs or cushioning means of any known type, for example, as in FIG. 8. And also optionally, each of the members 33A and 38 may comprise two parts. Thus making the member 38 in two, fore-and-aft-arranged parts enables separate removal of the motive means and drive shafts and of the vehicle-carried source of energy. The motive means preferably comprises two electric motors (42), each driving the rear axle and the rubber-tired wheel 41 via gearing (optionally comprising speed-change gearing) and an overrunning or other clutch. Preferably the bottom 38 comprises two strong plates of steel or aluminum alloy, upwardly flanged for extra strength, the forward, bolted one supporting batteries (or a compressed air or fuel tank), and the rearward one, supporting the motive means and reciprocating under shock, having bearings between its flanges and the frame 33.

(7) The cans 43, 44, 45 and 46, fastened together in rows between appropriately shaped apertured strips similar to 9 or 14, are assembled at rounded corners as in FIG. 3, placed around the box 38, and bonded and-/or bolted to the wire-mesh sheet of step (5). These rows comprise upper and lower tiers of cans flanking and bonded to the sidewalls 39 and 40.

(8) In operation on a roadway, the roll-limiting sidewheels 47 are normally clear of the road surface 48, but on abnormal rolling of the vehicle one of them contacts the road. Each assembly of a sidewheel and its support comprises: a horizontal metal plate 49; welded-together pairs of inclined plates 50 and U-channeled vertical plates 50A, both welded to 49; a bearing block 51, providing a rotary bearing for a sidewheel axle, vertically reciprocating under shock from the road; and the shock absorber 51A (for example comprising strong foam rubber). Any known type of wheel bearing and shock absorber may be substituted for the somewhat schematically illustrated bearing and shock-taking element of FIG. 8. This step (8) comprises fastening the sub-assembled sidewheels and their supports to the bottoms of can-rows 28, 32 and 34. (Preferably the sidewheels are nearer to the outer edges of the bumpers 56 than their illustrated position in FIG. 6.) The strips of mesh or pipestrap that in operation will be below the cans of 28, 32 and 34 are coated with epoxy putty (opposite the sidewheel positions these strips preferably have bolts 52 (FIG. 2) which are adapted to fit in holes drilled thru the plate 49). The plate 49 is also coated with epoxy putty; this plate is threaded over the bolts 52, which are thus located between plates 50 and 50A on each vehicular side, and nuts in these spaces are screwed on the bolts tightly against the plate 49.

(9) A metallic or reinforced-plastic mesh or solid-material sheet is stretched in a loop around the can sidewalls of the rows 43, 44, 45 and 46 (FIG. 6) and bonded to them. The strips of mesh that are fixed to ends of the cans 43 to 46, and are adjacent to edges of the bottom 38, are stuccoed with cement (exoxy or Portland cement) and light-weight aggregate (for example, cinders, expanded clay or shale, cedar or cypress sawdust or short fibers of shredded cypress bark), and topped with one or two coats of epoxy putty. When the strip around the sidewalls of cans 43 to 46 is mesh (not solid material) it also is similarly stuccoed. And all the exposed portions of the mesh (or the pipe strap and can ends) of the can rows 28 to 34 — the portions that are around the middle wheel-and-motive-power-supporting means — are likewise strongly stuccoed. This lower skin means, preferably comprising mesh and stucco, completes construction of the lower structure.

(10) The completed lower part of the body is turned over, the next higher tier of the sidewall rows 28 to 31 is fastened on top of the lowest tier of these rows, formed in step (1). This fastening preferably comprises placing epoxy between the two superposed, contiguous apertured strips (9 or 14 or 17) and bolts thru the two strips.)

(11) The next higher tier of the rows 28 to 31 is fastened in place as in step (10); and the upper bumper rows of cans 52 and 53 are assembled and twist-wired and bonded to each other and to the bottom rows 34.

(12) Strips of thick, tough, resilient rubber, 54, are stretched around and bonded with epoxy or silicone rubber cement to each of the sts of insulation-filled bumper cans; and over each of these sets a horizontal strip 55 of such rubber is similarly bonded, thus completing the bumpers 56, 57 and 58.

(13) The remainder of the sidewall can-rows 28 to 31 are successively twist-wired and bonded in place, up to the top of the vehicle. At the level of each of the doors 61 there is a gap between rows of sidewall cans and can-reinforcing apertured strips. (14) The can rows 60 of the top 62 of the body (reinforced by mesh or pipe strap) are successively assembled in accordance with the method of step (2). But the middle gap in this case is narrower than that of step (2), so that each adjacent pair of the two pairs of ends of the oppositely curved center-most can rows (63 and 64) are contiguous and fastened together with epoxy putty and, optionally, also with short pieces of pipe strap and glued-over screws. Then into the relatively narrow, curved middle gap, short, vertically extending tubular elements, 66 (small-diameter pieces of bamboo or plastic pipe of the water-conveying type), are placed and epoxy-bonded together.

(15) Over the whole of the can-rows 60 and the filler tubular elements 66 and the top set of the can rows 28 to 31 a sheet of wire mesh is stretched and epoxy-bonded (and optionally sheet-metal-screwed) to the upper can ends and pieces 9 and 9' (or 14 or 17) of can-reinforcing network. A similar sheet, 68, is similarly fastened to under surfaces of the can-rows 60.

And other similar sheets are screwed and epoxy-putty-bonded on the outside can-sidewall surfaces (at 69 and 70) and on the inside can-sidewall surfaces of the rows 28 to 31 (at 71).

(16) A deck skin is made, preferably by troweling epoxy (or Portland) cement stucco of the above-described type, preferably in two coats, on the upper surfaces of the deck can-rows 32, and optionally topping it with glued-in-place decking 72 of tough rubber, other plastic or plywood.

(17) Wall skin means is completed preferably by troweling epoxy (or Portland) cement stucco of the above-described type in two or more coats on the sheets of mesh that were applied in step (15). And optionally, sheets of tough, resilient rubber or other plastic may be strongly glued to the mesh on the outside can-sidewall surfaces at 69 and 70 and on the top 62.

(18) Optional balloon means (exampled in FIG. 7 as comprising two large balloons, and a smaller space-filling balloon, 74), containing helium, may be placed in the top part of the body and optionally glued with epoxy or silicone-rubber cement to the under surface of the top 62. These balloons preferably have tire-valve-type gas inlets, for adding helium to replace any that is lost thru the thin balloon walls.

(19) The steerable front-wheel sub-assembly is installed. The rubber-tired wheel 76 of this assembly is shock-absorbingly mounted and turned for steering in the general manner of mounting and steering motorcycle wheels. The axle of this wheel rotates in bearings 77 that are supported in a motorcycle-type steering fork, 78. This fork is fixed to the tubular shaft 79, which passes thru the deck via bearings mounted in a tubular bearing support having a diameter equal to that of a can 32 and is attached to the steering wheel 80. When the vehicle is mainly used as an aircraft the wheel 76 is thinner, of much larger diameter and is used to steer the vehicle in the air, as well as on the ground. In this event the rear wheel 41 also is increased in diameter and is used for propulsion on the ground and directional stability in the air.

(20) The doors 61 are hinged in the doorway gaps provided in step (13), thus completing the vehicle of FIGS. 6 and 7.

The form of the vehicle illustrated in FIGS. 9 to 11 is made in the general manner described in the above steps (1) to (20). But there are some differences in these two vehicular types. In the form of FIG. 9, the curved-axis rows 81, 82 and 82A, comprising parallel-axes cans within curved, reinforcing, apertured strips similar to 9, 9' (or 14), extend transversely of the vehicle, instead of longitudinally as in FIGS. 6 and 7. Each adjacent pair of ends of the rows 81 and 82 are joined in an overlapped-mesh (or overlapped-pipestrap) corner, C, of the type shown in FIG. 3; and adjacent pairs of ends of the rows 81 and 82A are similarly joined at corners D. The deck optionally may comprise can-rows that are similar to 32 (except that the parallel can-axes of each row of the cans and the flanges 10 are arranged along straight lines, instead of curved lines as in FIGS. 1 and 6); but as exampled, the deck has hollow elements 83 with fore-and-aft axes. These elements optionally may be tubes (preferably having corrugated walls) that extend from the front-end wall to the rear-end wall. But preferably each of the elements 83 comprises cans that are end-joined by epoxy putty or other bonding material, providing much bamboo-like strength per unit of weight at the bonded joints between can ends.

FIG. 10 may be considered as a sectional view (from the fore-and-aft plane 10-10 of FIG. 9) of either the front-end or the rear-end body wall. Each of these walls is curved outward from the central part of the vehicle, as in FIG. 6, and as in FIG. 6 optionally may comprise parallel-axes cans. But as exampled in FIGS. 9 and 10, each of the end-wall can-rows comprises cans 84 and 85 of different diameters, with end caps of the smaller cans 85 partly within end caps of the larger cans 84 and strongly bonded to 84 with epoxy putty or the like, 86. Each end can (84') of these rows is fastened to an adjacent end can (82') of a sidewall row (82 or 82A) by a piece of pipe strap 88, which is looped around the can 84', twisted at 89, both above and below the can 82', and screwed and epoxy-bonded to upper and lower portions of the can-wall of 82'. Optionally and preferably, an extra-strong junction between the two rows of cans is made by cutting a hole at 90 in the end cap of 82', depressing a portion of it, and strongly bonding part of the end of 84' within the recess thus formed (this bonding being done before fastening the tie element 88 in place). Preferably, the cans 84 and 85 are of equal lengths.

The bottom part of the vehicle of FIG. 9 is somewhat similar to that of FIG. 7. But as exampled in FIG. 9, the frame 33 and cover 33A are eliminated and the wheel 41 and box 38, 39 and 40 are partly within the deck cans 83. This arrangement optionally may also be provided in the form of FIG. 6, in which event the rows 44 and 46 are curved to conform to the oppositely bowed pair of rows 32 that flank 44 and 46.

Various changes may be made within the scope of the following claims. For instance, the invention obviously may be adapted for use in a vehicle of three or four road-engaging wheels, instead of the illustrated two wheels of this type. And a V-shaped mass or strip of insulation (92) (for example, of foam plastic or fiberglass) may be glued, adhesive-taped or otherwise fastened in the outer groove between each pair of the parallel-axes cans.

In the claims, unles otherwise qualified: the term "tubular member" means a single, elongated tube or pipe of any cross-sectional shape or a fastened-together row of cans of any cross-sectional shape; the word "can" signifies a tube of any cross-sectional shape, having end closure elements; "rod-like element" means a screw, rivet or bolt; "bonding material:" epoxy putty or other glue, solder, welding or brazing material; and "gaseous material:" any pure gas, mixture of gases, or gas-containing insulation or plastic (for example, gas-cell-containing foam plastic), under atmospheric or above-atmospheric pressure.

I claim:

1. A vehicle, adapted to travel over land, including:
 body structure comprising: at least four elongated, fastened-together, body-sidewall can-rows, each of which includes a plurality of aligned cans having substantially parallel axes that extend across the length of the row, each pair of said cans being in contact with each other at contiguous side portions and free of contact with sides of cans of other sidewall rows, and means for fastening the cans of each row together comprising at least one elongated, apertured strip of row-strength-providing material, lying on and across ends of the parallel-axes cans of the row, and means extending thru holes in said strip for fastening the strip and said can-ends together, at least one of the said strips being located between each adjacent pair of the can-rows, the said body structure further including: means, fixed to said strips, for fastening the can-rows together in sidewall framework on each side of the vehicle; forward and rearward end-wall frameworks, comprising tubular members; means fastening said end-wall tubular members to said sidewall rows; top framework, comprising tubular members; means fastening said top framework to portions of said sidewall rows; deck framework, comprising tubular members; means fastening said deck framework to portions of said sidewall rows; skin means, sheathing the said sidewall, top and deck frameworks; and gaseous material within each of said cans and tubular members;

front wheel-supporting means on said body structure, pivotal for steering, comprising bearings and bearing-support means connected to portions of said frameworks;

rear wheel-supporting means on said body structure, comprising rotary wheel bearings and bearing-support means; and wheels supported by said front and rear wheel-supporting means.

2. A vehicle as set forth in claim 1, in which said can-rows comprise: cans of the used type, having holes in can ends; and means sealing the said holes.

3. A vehicle as set forth in claim 2, in which said hole-sealing means comprises adhesive tape.

4. A vehicle as set forth in claim 1, in which the said strip is apertured and the said means fastening the cans of each row together comprises: a second apertured strip of row-strength-providing material, forming with said first-named strip a pair of such strips, one of which is located on one can-end side of said row and the other being located on the other can-end side of the row; and bonding material between each of said strips and row-arranged cans.

5. A vehicle as set forth in claim 4, in which: the said means fastening the cans of each row together further comprises rod-like elements extending thru apertures in said strips and fastened to ends of the cans; and portions of said bonding material cover said rod-like elements.

6. A vehicle as set forth in claim 4, in which each of said pair of strips is a band of metallic mesh, having a flange on each side of said can row, each flange embracing can-sidewall portions at one set of the ends of the row-arranged cans, the said flanges on each of said strips extending toward the center of the can row and toward oppositely extending flanges on the other of said strips.

7. A vehicle as set forth in claim 1, in which said frameworks comprise a plurality of four-part can-row structures, each of which includes: four end-joined rows of parallel-axes cans; gaseous material in said cans; a pair of apertured strips of row-strength-providing material on opposite can-ends of each row; bonding material between said strips and can-ends; and means fastening together each adjacent pair of row ends in a strength-providing corner of the vehicle, comprising extended end portions of a said pair of the apertured strips which jut beyond cans to which the strips are fastened and straddle a row-end can and its associated, overlapped end portions of an adjacent pair of apertured strips, and further comprising a screw, passing thru apertures of each of said extended end portions and said associated end portions and into said end can, at each can-end side of said four-part structure.

8. A vehicle as set forth in claim 7 in which said apertured strips are bands of metallic mesh, having integral, bent flanges at their sides that embrace can-sidewall portions, the said flanges terminating opposite a can at said extended end portions, and the said end portions being in substantially planar condition, adapted to closely overlap end portions of adjacent apertured strips and end cans.

9. A vehicle as set forth in claim 4, in which said rows of parallel-axes cans and associated apertured strips are outwardly curved, in a direction from the interior of the vehicle.

10. A vehicle as set forth in claim 4, in which: each of said end-wall tubular members of each of said end-wall frameworks is a row of parallel-axes cans, at substantially the same level as a pair of said body-sidewall can-rows and as an opposite end-wall row of parallel-axes cans; each set of four can rows at substantially the same level being joined at four corners;

each of said corners comprising: extended end portions of a pair of the apertured strips which jut beyond the cans of a can-row, and overlap and hold between them a can and its can-end-engaging portions of apertured strips; and means fastening said extended portions to said can-end-engaging portions and to adjacent can ends.

11. A vehicle as set forth in claim 10, in which said apertured strips comprise metallic mesh, having side flanges embracing can sidewalls.

12. A vehicle as set forth in claim 4 in which: each of said tubular members of said deck framework is a row of parallel-axes cans; and the said skin means comprises a layer of solid material on said deck framework.

13. A vehicle as set forth in claim 4, in which: each of said tubular members of said top framework is a row of parallel-axes cans; and a portion of said skin means is fixed to can ends of said top rows.

14. A vehicle as set forth in claim 4, in which: each of said tubular members is a row of parallel-axes cans.

15. A vehicle as set forth in claim 4, in which said frameworks comprise a plurality of angularly-arranged can-row structures, each of which comprises: an upwardly curved top row of said parallel-axes cans, which is part of said top framework; located at each end of said top row, the upper end of an upright, outwardly curved sidewall row of said parallel-axes cans, which is part of said sidewall framework; means fastening together each adjacent pair of ends of said top and sidewall rows of cans in a strength-providing corner of the vehicle, comprising extended end portions of a said pair of the apertured strips which jut beyond cans to which the strips are fastened and straddle a row-end can and its associated overlapped end portions of the adjacent pair of apertured strips, and further comprising means fastening said overlapping extended end portions to said associated end portions, comprising a screw passing thru apertures of said corner portions and into said end can, at each side of said end can.

16. A vehicle as set forth in claim 15, in which: each of said tubular members of said deck framework is a straight can-row, comprising parallel-axes cans and a pair of said apertured strips fastened to each can-end of said straight can-row; and the deck further comprises a layer of solid material on said deck framework.

17. A vehicle as set forth in claim 15, in which each tubular member of said forward and rearward end-wall frameworks comprises: a plurality of end-joined cans; and means fastening said end-joined cans together in an outwardly curved end-wall row, comprising bonding material between can ends.

18. A vehicle as set forth in claim 17, in which each adjacent pair of said end-joined cans are of different cross-sectional areas.

19. A vehicle as set forth in claim 4, in which: said wheels comprise a single front wheel, rotatable in a plane that is substantially at the fore-and-aft center line of the vehicle; and the vehicle further comprises a pair of sidewheel supports and a pair of sidewheels connected to said sidewheel and sidewheel supports being constructed and arranged to provide clearance between each sidewheel and the roadway during normal travel of the vehicle over a substantially level surface and to allow roll-limiting engagement of a sidewheel with the roadway on sidewise rolling of the vehicle by a substantially predetermined amount.

20. A vehicle as set forth in claim 19, further comprising lighter-than-air balloon means, connected to an upper part of said body structure, having a center of aerostatic lift approximately located in said plane, aiding in stabilizing the vehicle against rolling motion.

21. A vehicle as set forth in claim 19, in which the said wheels comprise a single rear wheel, rotatable in said plane.

22. A vehicle as set forth in claim 1, in which some of the said body-sidewall can-rows and of said means fastening the cans of each row together have doorway gaps, and the vehicle further comprises: doors in said gaps; bumper can-rows forward and rearward of said doors, comprising bumper cans alongside body-sidewall can-rows, having axes that are substantially parallel to each other and to axes of cans of said body-sidewall can-rows; means fastening the said bumper cans together; and bumper skin means sheathing outer surfaces of said bumper cans.

23. A four-part car-body structure, comprising:
four end-joined rows of parallel-axes cans; each of said rows comprising a pair of can-holding strips of row-strength-providing material on opposite can-ends of the row and bonding material between said strips and can-ends; and
means fastening together each adjacent pair of row ends in a strength-providing corner of the structure, comprising extended end portions of a said pair of the strips which jut beyond cans to which the strips are fastened and straddle a row-end can and its associated, overlapped end portions of an adjacent pair of the strips, and further comprising a rod-like element at each can-end side of said structure, passing thru apertures in one of said extended end portions and one of said associated end portions and into said end can.

24. Structure as set forth in claim 23, in which: said can-holding strips comprise metallic mesh; and said means fastening together each adjacent pair of row ends further comprises bonding material on and between said extended end portions, said associated end portions and said row-end can.

25. A vehicle as set forth in claim 23, in which at least one of said can-holding strips comprises an integral flange at each side of the strip, flanking and contacting portions of the sides of said cans of the row; the said flanges terminating at flange ends adjacent to the said extended end portions.

* * * * *